United States Patent [19]

Hess et al.

[11] 3,846,545

[45] Nov. 5, 1974

[54] STABLE COPPER BASE FUNGICIDES

[75] Inventors: Earl H. Hess, Lancaster, Pa.; Daniel M. Kennedy, East Brunswick, N.J.; Charles I. Whitman, Garden City, N.Y.

[73] Assignee: International Copper Research Association, Inc., New York, N.Y.

[22] Filed: July 21, 1970

[21] Appl. No.: 64,031

Related U.S. Application Data

[63] Continuation-in-part of Ser. No. 579,550, Sept. 15, 1966, abandoned, and a continuation of Ser. No. 703,337, Feb. 6, 1968, abandoned.

[52] U.S. Cl. .................. 424/143, 424/127, 424/128, 424/133, 424/140

[51] Int. Cl. .......................................... A01n 11/04

[58] Field of Search ........... 424/143, 127, 128, 133, 424/140

[56] References Cited

UNITED STATES PATENTS

| | | | |
|---|---|---|---|
| 1,291,013 | 1/1919 | Jones | 424/143 X |
| 1,384,304 | 7/1921 | Cook | 424/143 X |
| 1,618,371 | 2/1927 | Engelmann | 424/143 X |
| 1,620,490 | 3/1927 | Sanders | 424/143 X |
| 2,540,209 | 2/1951 | Nikitin | 424/143 X |
| 2,581,951 | 1/1952 | Harshaw et al. | 424/143 X |
| 3,290,210 | 12/1966 | Engle et al. | 424/143 X |

OTHER PUBLICATIONS

Martin et al., Remington Pharmaceutical Science, 1965, pp. 173–181.

Frear, Chemistry of the Pesticides, Apr. 3, 1958, pp. 322–325.

Freeman Mason, Spraying, Dusting and Fumigating of Plants, 1928, pp. 91–92.

*Primary Examiner*—Albert T. Meyers
*Assistant Examiner*—Allen J. Robinson
*Attorney, Agent, or Firm*—Pennie & Edmonds

[57] ABSTRACT

A substantially stable copper base fungicide in powder form comprising dehydrated precipitates of an aqueous mixture of a copper salt and an alkali is prepared by mixing a water soluble copper salt with an alkali in an aqueous solution to prepare a copper base precipitate and thereafter dehydrating the resultant mixture in an atmosphere sufficient to maintain the structure of the copper base precipitate. The fungicide thus produced is capable of being redispersed in water to form an aqueous spray mixture having fungicidal activity at least equivalent to and phytotoxicity substantially lower than a corresponding freshly prepared aqueous spray mixture of the copper salt and alkali.

9 Claims, 1 Drawing Figure

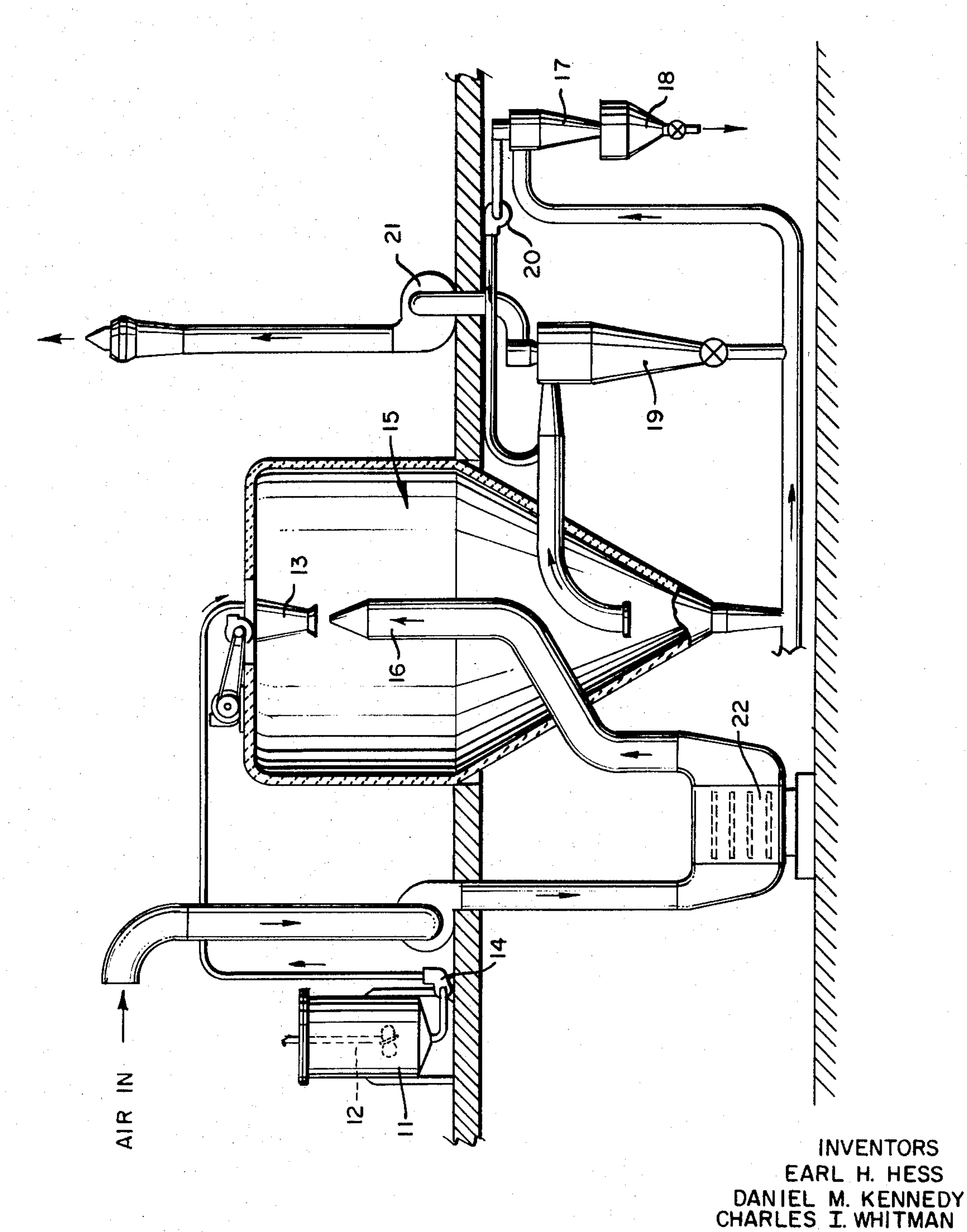
INVENTORS
EARL H. HESS
DANIEL M. KENNEDY
CHARLES I. WHITMAN
BY
Rennie, Edmonds, Morton, Taylor and Adams
ATTORNEYS

STABLE COPPER BASE FUNGICIDES

CROSS-REFERENCE TO RELATED APPLICATION

This invention is a continuation-in-part application of our copending application Ser. No. 579,550 filed on Sept. 15, 1966 entitled "COPPER FUNGICIDES", now abandoned, and a continuation of our application Ser. No. 703,337, filed Feb. 6, 1968, now abandoned.

BACKGROUND OF THE INVENTION

I. Field of the Invention

This invention relates to copper fungicides and, more particularly, to a new class of stable copper base fungicides in powder form which can be readily mixed with water to form an aqueous spray mixture having high fungicidal activity, good weatherability and extremely low and in some cases no phytotoxicity even at a copper concentration substantially higher than that required for fungicidal control. The invention also relates to the process for preparing this novel class of copper fungicides.

II. Description of the Prior Art

The fungicidal activities of certain copper salts, notably copper sulfate, have long been recognized. Their application as foliar fungicides, however, is limited because of their high phytotoxicity and poor weatherability. In late 19th Century, Millardet discovered that the phytotoxicity of copper sulfate can be substantially reduced and its weatherability improved by adding calcium hydroxide to an aqueous solution of $CuSO_4$ and quickly applying the resultant hydrogel suspension to the plant. This discovery led to the development of a practical foliar fungicide which is known as Bordeaux mixture.

Since the discovery of Bordeaux mixture, a number of related copper base fungicides were also successfully prepared by mixing an aqueous solution of a copper salt with an alkali to form a suspension of precipitates. The better known copper fungicides are the Burgundy mixture, a precipitate of copper sulfate and sodium carbonate; Eau Celeste, a precipitate of copper sulfate and ammonium hydroxide; and copper oxychloride, a precipitate of copper chloride and an alkali base. While these "fixed" copper fungicides are satisfactory in many fungicidal applications, they all have some inherent disadvantages that render their application as foliar fungicides cumbersome and in some instances not practical.

Bordeaux mixture, for example, has undesirable phytocidal properties. Furthermore, its precipitates are not stable. They decompose shortly after mixing, i.e., about one-half of an hour, into a number of crystalline products which have markedly lower fungicidal activity than the freshly prepared Bordeaux mixture. The instability of the precipitates requires the preparation of the Bordeaux mixture shortly before its application usually in the field where measuring, dissolving and mixing of separate powder components are inconvenient and troublesome. This disadvantage also renders them unsuitable for many modern mechanized spraying techniques.

A number of attempts have been made to develop dehydrated Bordeaux preparations which may be readily reconstituted with water to produce a fungicidally effective hydrogel. A practical dehydrated Bordeaux fungicide has the obvious advantage that the preparation of the spray mixture in the field is simplified and that it can be easily adapted to a variety of mechanized spraying devices. Indeed, dry Bordeaux type of fungicides are available commercially in various forms, many of which are simply powdered mixtures of a copper salt and an alkali. Other commercial forms of dry Bordeaux type fungicides are essentially dehydrated precipitates which have been dried by one of a number of conventional means, such as oven drying. These dry Bordeaux fungicides exhibit lower fungicidal activity and substantially less adhesion to plant leaves than the freshly prepared hydrogels. The low adhesion property of these fungicides leads to poor weatherability.

The exact reason why such preparations are less effective than the freshly prepared Bordeaux type mixtures is not known. The complex nature of the freshly prepared precipitates makes analytical study extremely difficult. Accepted analytical procedures had failed to define their chemical structures. The fungicidal property of Bordeaux type precipitates appears to be closely related to their physical and chemical structures. By subjecting the precipitates to a dehydration process or allowing the unreacted copper salt and alkali to stand for a period of time, the structure of the reconstituted suspension is greatly altered. The change of the structure, hence their fungicidal property, is particularly noticeable where the precipitates are slowly dried, or otherwise are allowed to stand for a long period leading to crystallization and decomposition.

Attempts to reduce the phytotoxicity of the dry fungicidal preparations and simultaneously to retain their fungicidal activity have not been successful. The treatments associated with these prior attempts invariably reduce the fungicidal activities of the fungicides.

SUMMARY OF THE INVENTION

The present invention provides a stable copper base fungicide in powder form. It comprises dehydrated precipitates of an aqueous mixture of a copper salt and an alkali. It is capable of redispersing in water to form an aqueous spray mixture having fungicidal activity at least equivalent to and phytotoxicity substantially lower than a corresponding freshly prepared aqueous spray mixture of the copper salt and alkali without substantially altering its weatherability.

DESCRIPTION OF THE PREFERRED EMBODIMENTS

Preferably the copper fungicide of this invention is a dehydrated precipitate of a freshly prepared aqueous mixture of copper sulfate and calcium hydroxide. The aqueous mixture may contain 5 to about 10 parts by weight of copper sulfate, 3 to about 10 parts by weight of calcium hydroxide and 100 parts by weight of water.

Other combinations of copper salt and alkali that have been found eminently suitable include: (a) copper sulfate and sodium hydroxide; (b) copper sulfate and ammonium hydroxide; (c) copper sulfate and sodium carbonate; (d) copper chloride and sodium hydroxide; (e) copper chloride and ammonium hydroxide; (f) copper chloride and calcium hydroxide; (g) copper acetate and calcium hydroxide; (h) copper acetate and ammonium hydroxide; and (i) copper acetate and sodium hydroxide. In these combinations copper salts may be replaced with a number of water soluble salts such as copper phosphate, copper silicate and copper arsenate.

Advantageously, the copper base fungicide of this invention is prepared by mixing a water soluble copper salt with an alkali in an aqueous solution to produce a suspension of copper base precipitates. The aqueous suspension is then atomized into a stream of hot gas having a temperature in the range from about 150° to about 600°F. and preferably 175° to 350°F. in a chamber to evaporate the water thereof. The dehydrated product is then recovered from the chamber. It is found that the spray drying technique used in accordance with the present invention produces a stable copper base fungicide in powder form and the preponderant portion of which is an amorphous solid and the remainder is a crystalline substance. The powder fungicide is readily redispersable in water to form a hydrogel-like suspension with equivalent fungicidal activity comparing to a corresponding freshly prepared Bordeaux-like mixture but with remarkably lower phytotoxicity.

Alternatively the copper base fungicide of this invention may be prepared by initially mixing a copper salt with an alkali in an aqueous solution to form a suspension of copper base precipitates. The temperature of the aqueous suspension is then lowered and the low temperature suspension subsequently is placed in a vacuum chamber to eliminate the water therein by vaporization or preferably by sublimation when the suspension is frozen. The recovered dehydrated product made by the low temperature and high vacuum drying technique also exhibits high fungicidal activity with extremely low or no phytotoxicity.

Further to illustrate this invention, specific examples are described hereinbelow with reference to the accompanying single sheet of drawing which illustrates a conventional spray drying apparatus for preparing the copper base fungicide of this invention. Using the spray drying apparatus it is preferred that the aqueous solution of copper salt and the suspension or the solution of the alkali of predetermined concentrations be prepared separately. The two solutions are then mixed in a mixer 11 which is equipped with a mechanical stirrer 12. (sodium alkyl aryl sulfonate)

Depending on the total volume to be mixed, the mixing and consequently the interaction of the copper salt and the alkali may be accomplished within a few minutes. Generally, a fine precipitate in the form of a hydrogel suspension is formed. It is not desirable to prolong the mixing to more than an hour. Mixing for much longer than this period may lead to undesirable decomposition and crystallization. The solid concentration of the resultant slurry may be varied within a wide range without appreciably effecting the biological activities of the spray dried products as will be apparent from examples described hereinbelow. The upper limit is defined by the physical nature of the slurry which tends to form a nonpumpable gell when the solid concentration is too high. In the case of Bordeaux mixtures such limit is reached when 12 parts of copper sulfate and 12 parts of lime are mixed with 100 parts of water. It is generally not desirable to use a slurry with very low solid content because of the increasing energy that must be used to evaporate the water. Furthermore at low solid concentration, the freshly prepared mixture tends to form undesirable crystalline precipitates at a faster rate than the corresponding mixture with higher solid content. For the mixture with low solid content, the duration between preparation and spray drying that can be tolerated therefore is correspondingly shorter. A range of 5 parts to 20 parts of solids per 100 parts of water is preferred.

The slurry with suitable solid concentration is fed to an atomizing nozzle 13 by pump 14. The atomizing nozzle 13 may be a conventional pressure nozzle in which the liquid is pumped at high pressure and with a rapid circular motion through a small orifice. For the present invention, the nozzle preferably is a two-fluid nozzle in which a gas such as air at relatively low pressure is used to tear the liquid into droplets.

The atomized slurry is introduced into a large drying chamber 15 where the droplets are dispersed into a stream of heated air from an air disperser 16. The drying gas which is heated by a heater 22 may enter at the highest practical temperature, i.e., 175° to 550°F. We found an inlet temperature in the range of 200° to 350°F. to be particularly suitable.

The feed rate of the slurry to the atomizer depends on the size of the nozzle, the drying temperature, the concentration of the slurry, the size of the chamber and other variables. The rate should be adjusted according to the gas temperature so the particles of liquid evaporate rapidly and dry before they can be carried to the side of the chamber. The bulk of the dried powder which results falls to the conical bottom of the chamber and is removed by a stream of air to a cyclone. The product is recovered from a product collector 18. The principal portion of the exit gas is also fed to a cyclone or a dust collector 19 to remove the entrained product. The exhaust gas from cyclone 17 is fed to the exit gas stream by pump 20 to recover fine powders not precipitated by the cyclone. The exhaust gas from the cyclone 19 is vented by pump 21.

Low temperature high vacuum drying advantageously is carried out in a conventional freeze-dryer. The solid and its moisture after frozen are introduced into the vacuum chamber of the dryer which may have a pressure in the range of 0.1 to about 0.4 mm. Hg. The necessary heat may be provided by carefully controlled exposure to infrared radiation or by other convenient indirect heating devices. When the suspension is not frozen, its temperature should be kept as low as possible, preferably at a temperature below 45°F.

In the following examples the above-described drying techniques were used to prepare various copper base fungicides of this invention. For the purpose of comparison some samples were dehydrated in shallow Pyrex pans placed in a forced draft laboratory oven at 110°C. These samples are identified as oven dried fungicides.

Unless otherwise stated, the two forms of numerical designations for specific formulations used in the following examples are to be construed as follows:

1. two numbers separated by a hyphen (-) designates a mixture prepared for spray drying, the first number being the weight of the solid and the second number the weight of water (i.e., 10-100 formulation refers to a mixture containing 10 parts solid and 100 parts water by weight); and
2. three numbers separated by hyphens (-) designates (a) a reconstituted mixture from the dried fungicide, with the first two numbers being the weights of the copper compound and the alkali respectively as compared to corresponding freshly prepared mixtures and the third number being the amount of water in gallon or (b) the freshly prepared mixture (i.e., 10-10-100 formulation referring to a reconstituted mixture of a freshly prepared mixture containing 10 pounds of a copper compound and 10 pounds of an alkali in 100 gallons of water).

Example 1

A Bordeaux type "fixed" copper fungicide was prepared by mixing an aqueous solution of copper sulfate containing 150 parts cupric sulfate pentahydrate in 2,250 parts water and a calcium hydroxide suspension containing 150 parts alkali and 750 parts water. The two solutions were mixed together using a mechanical stirrer for a period of 7 to 9 minutes to form a 10-100 formulation. The resultant slurry was dried by three different techniques described hereinabove. Sample 1-0 was oven dried, sample 1-F was freeze dried and samples 1-SV, 1-SH, 1-SM and 1-SL were spray dried with different drying temperatures.

Sample 1-F was prepared by taking 400 ml. of the 10-100 Bordeaux mixture and removing the water by maintaining under 0.3 mm. pressure for 14 hours in a freeze drying apparatus with the cold trap kept at Ca-40°C. The yield was 96 percent of the theoretical.

Sample 1-SV was spray dried using an inlet gas temperature of 500°F. and an outlet temperature of 300°F. Sample 1-SH was similarly dried with the exception that the outlet temperature was lowered to 250°F. Samples 1-SM and 1-SL were dried at moderate and low temperatures respectively using an inlet temperature of 300°F. and an outlet temperature of 220°F. for 1-SM and an inlet temperature of 200°F. and and outlet temperature of 150°F. for the latter.

A second hydrogel precipitate was prepared using the same amounts of copper sulfate and calcium hydroxide as the first but with half the amount of water to form a 20-100 Bordeaux mixture. Half of this second precipitate (sample 1A-SM) was spray dried at 300°F. inlet temperature and 220°F. outlet temperature and the other half (sample 1A-O) was oven dried. A third preparation was made by mixing 75 parts of hydrated lime with 750 parts cold tap water in a blender and subsequently adding 75 parts of copper sulfate dissolved in 2,250 parts of water. The resultant slurry was mixed for 30 seconds to form a 5-100 Bordeaux mixture. The mixture was used to prepare sample 1B-SM by spray drying at inlet and outlet temperatures of 300°F. and 220°F. respectively.

For comparison, two additional samples were prepared. Sample 1-D was a freshly prepared Bordeaux mixture of the same copper concentration. Sample DB was dry Bordeaux mixing equal parts of dry $CuSO_4$-$H_2O$ and CaO.

The samples were analyzed and the data is tabulated and appears in Table I.

Table I

Analytical Data

| Sample Designation | % Cu | % $SO_4$ | % Ca as $Ca(OH)_2$* | % Moisture** O.D. | % Moisture** Calc. by diff. | Calc. Moles Hydrated $H_2O$/Mole Cu | pH initial | pH after drying |
|---|---|---|---|---|---|---|---|---|
| 1-SL | 13.1 | 20.5 | 53.1 | 4.3 | 13.4 | 3.60 | 12.2 | 12.1 |
| 1-SM | 14.5 | 21.8 | 53.6 | 2.3 | 10.2 | 2.48 | 12.2 | 11.9 |
| 1-SH | 14.4 | 20.2 | 54.0 | 1.1 | 11.2 | 2.76 | 12.2 | 12.0 |
| 1-SV | 13.0 | 21.5 | 50.9 | 2.5 | 14.6 | 3.95 | 12.2 | 12.0 |
| 1B-SM | 12.5 | 19.2 | 55.1 | 3.0 | 13.2 | 3.72 | 12.2 | 12.2 |
| 1A-SM | 13.5 | 22.1 | 53.8 | 3.4 | 10.6 | 2.76 | 12.2 | 12.3 |
| 1-O | 14.0 | 22.0 | 49.4 | — | 14.6 | 3.67 | 12.2 | 12.1 |
| 1A-O | 13.5 | 22.5 | 51.6 | — | 12.4 | 3.23 | 12.2 | 12.2 |
| 1-F | 13.5 | 21.0 | 44.8 | — | 20.7 | 5.40 | 12.2 | 11.9 |
| DB | 20.8 | 32.5 | 41.3 (as CaO) | — | 5.4 | 0.91 | — | 12.2 |

The percentage by weight of copper, sulfate and calcium were determined by standard method of chemical analysis. The copper was determined by classical iodometric titration using potassium iodide, sodium thiosulfate, and starch indicator. Sulfate analysis were performed by precipitation with barium chloride and gravimetric determination. The calcium content was determined by chelametric titration using sodium ethylenediamine-tetracetate, after the copper is removed by hydrogen sulfide.

All the dehydrated samples were resuspended in water to form dilute aqueous suspensions each containing approximately 0.24 percent copper by weight. The biological activities of these preparations as well as the freshly prepared Bordeaux with the same copper concentration were evaluated in a standard control test by applying the aqueous suspensions by an atomizer to potted tomato plants of uniform size which were positioned on a revolving turntable. Each tomato plant received a dosage of 20 milliliters. When the spray deposits were dried, the plants were exposed to an artificial rain fall at a rate equivalent to 1 inch of rain per hour. All the plants were then innoculated with the tomato Early Blight organism (Alternaria Solani) and incubated for 24 hours, after which lesion counts were made and percent disease values were determined for each experimental group based on a comparison with untreated tomato plants also innoculated with the tomato Early Blight organism. The values reported represent averages for three plant groups. The results of these tests are summarized in Table II below:

Table II

| Biological Data | | | | |
|---|---|---|---|---|
| Sample Code | No Rain % Disease | Spray Deposit Rating* | Rain % Disease | Spray Deposit Rating* |
| 1-SL | 2 | 1 | 8 | 3 |
| 1-SM | 4 | 1 | 14 | 2 |
| 1-SH | 1 | 1 | 17 | 2 |
| 1-SV | 3 | 1 | 7 | 3 |
| 1B-SM | 4 | 1 | 13 | 2 |
| 1A-SM | 2 | 1 | 12 | 3 |
| 1-O | 7 | 2 | 50 | 4 |
| 1A-O | 4 | 1 | 40 | 4 |
| 1-F | 2 | 1 | 27 | 3 |
| DB | 7 | 2 | light burn | 4 |
| 1-D | Burn | 1 | Burn | 1 |

* Ratings on spray deposit on leaves:
1 = heavy deposit
2 = moderate deposit
3 = light deposit
4 = no deposit visible The data tabulated in Table II illustrates that spray dried and freeze dried precipitates have greater fungicidal effectiveness, lower phytotoxicity, and better weathering resistance than oven dried precipitates and dry Bordeaux mixtures as well as freshly prepared Bordeaux mixture.

Example 2

Four copper sulfate-lime hydrogel precipitates were prepared in a manner similar to that described in Example I, with the exception that the ratio of lime to copper was varied.

The most common Bordeaux mixture consists of equal weights of copper sulfate and calcium hydroxide dissolved in a known volume of water. To express the ratio stoichiometrically, 1:1 mixture contains 3.38 equivalents of lime per equivalent of copper sulfate. In the example, samples 2-SA, 2-SB, 2-SC and 2-SD were prepared using 2.50, 1.75, 1.00 and 0.925 equivalents of calcium hydroxide per equivalent copper sulfate respectively. A 10-100 Bordeaux mixture was prepared for each of these samples and all the samples were spray dried at medium temperatures (300°F. inlet temperature and 220°F. outlet temperature). The dehydrated products were analyzed chemically and the results are tabulated in Table III with the composition of 1-SM.

Table III

| Analytical Data | | | | | | | | |
|---|---|---|---|---|---|---|---|---|
| Sample Designation | % Cu | % $SO_4$ | Ca as $Ca(OH)_2$ | % Moisture O.D. | % Moisture Calc. by diff. | Calc. Moles Hydrated $H_2O$/Mole Cu | pH initial | pH after drying |
| 2-SA | 17.1 | 27.4 | 44.2 | 5.8 | 11.3 | 2.33 | 12.2 | 12.3 |
| 2-SB | 18.1 | 29.3 | 41.8 | 6.3 | 10.8 | 2.10 | 12.2 | 12.0 |
| 2-SC | 23.4 | 35.4 | 23.7 | 10.0 | 17.5 | 2.63 | 10.6 | 10.3 |
| 2-SD | 23.5 | 36.8 | 24.6 | 8.5 | 15.1 | 2.26 | 4.8 | 10.5 |
| 1-SM | 14.5 | 21.8 | 53.6 | 2.3 | 10.2 | 2.48 | 12.2 | 11.9 |

The hydrogels and their corresponding spray dried products were compared biologically as in Example I, the results of which are summarized in Table IV. The data for sample 1-SM and 1-D from Example 1 as well as freshly prepared Bordeaux are presented below for comparison. The freshly prepared Bordeaux mixtures are designated 2-DA, 2-DB, 2-DC, and 2-DD, each of which had the same ratio of $CuSO_4$ to $Ca(OH)_2$ as the corresponding spray dried product of the same last alphabet designation, i.e., 2-DA has the same stochiometric ratio as 2-SA, etc.

Table IV

| Biological Data | | | | |
|---|---|---|---|---|
| Sample Code | No Rain % Disease | Spray Deposit Rating | Rain % Disease | Spray Deposit Rating |
| 1-SM | 4 | 1 | 14 | 2 |
| 1-SA | 2 | 1 | 10 | 3 |
| 2-SB | 2 | 1 | 10 | 2 |
| 2-SC | 2 | 1 | 10 | 3 |
| 2-SD | 2 | 1 | 9 | 4 |
| 1-D | Burn | 1 | Burn | 1 |
| 2-DA | Burn | 1 | Burn | 2 |
| 2-DB | 5 | 2 | Burn | 3 |
| 2-DC | 4 | 1 | 18 slight burn | 3 |
| 2-DD | Burn | 1 | Burn | 4 |
| Check | 100 | — | 100 | — |

Ratings on spray deposit on leaves:
1 = heavy deposit
2 = moderate deposit
3 = light deposit
4 = no deposit visible The above example illustrates that the spray dried fungicides provided by this invention have superior fungicidal activity and lower phytotoxicity than the fungicidal hydrogels from which they are produced. In addition, the above example illustrates that effective spray dried Bordeaux fungicides may be produced with a greatly reduced lime content, thereby providing effective fungicides at a reduced cost.

Example III

In this example different fungicidal precipitates were prepared in a manner similar to the procedures described in Example I, but utilizing a number of different copper salts and alkalies. The copper salts employed were copper sulfate pentahydrate, copper chloride dihydrate and copper acetate monohydrate while the alkalies used were calcium hydroxide, sodium carbonate, sodium hydroxide and ammonium hydroxide.

The various mixtures were spray dried using medium heating condition (300°F. inlet temperature and 220°F. outlet temperature), freeze dried and over dried. The samples were chemically characterized and tabulated in Table V. Included in Table V were a European sample of copper oxychloride and a sample of commercial regular production basic copper sulfate.

Table V

Analytical Data, Fixed Copper Samples

| Sample Designation | % Cu | % $SO_4$ | % Cu $Cl_2$ or Cu $(OAC)_2$ | % NaOH or $Na_2CO_3$ | % $NH_4OH$ | % Ca $(OH)_2$ | % Moisture by O.D. | % Moisture by Diff. | Moles $H_2O$/Mole Cu | pH Before Drying | Ph After Drying |
|---|---|---|---|---|---|---|---|---|---|---|---|
| 1-2AS-2.36 | 15.4 | 21.8 | — | 56.1 | — | — | 5.2 | 6.7 | 1.5 | 12/4 | 9.3 |
| 2-2AS-1.00 | 25.3 | 37.2 | — | 36.1 | — | — | 3.6 | 1.4 | 0.2 | 11.1 | 6.0 |
| 3-3AS-0.95 | 26.6 | 34.3 | — | 28.9 | — | — | 3.6 | 10.2 | 1.3 | 10.2 | 8.6 |
| 4-4AS-1.00 | 29.9 | 41.0 | — | — | 25.8 | — | 6.0 | 3.3 | 0.4 | 8.0 | 7.0 |
| 5-3BS-0.85 | 30.9 | — | 65.5 | 29.9 | — | — | 2.5 | 4.6 | 0.5 | 11.2 | 9.2 |
| 6-4BS-1.00 | 36.3 | — | 77.0 | — | 32,2 | — | 4.3 | −9 | 0.0 | 8.2 | 7.3 |
| 7-1BS-1.50 | 24.2 | — | 51.3 | — | — | 35.4 | 7.5 | 13.3 | 1.9 | 11.9 | 11.8 |
| 8-3CS-0.85 | 25.5 | — | 49.2 | 24.9 | — | — | 4.8 | 25.2 | 3.5 | 7.5 | 6.9 |
| 9-1CS-2.00 | 20.3 | — | 39.2 | — | — | 36.0 | 3.0 | 24.8 | 4.3 | 12.0 | 12.0 |
| 10-4CS-1.00 | — | — | — | — | — | — | — | — | — | — | — |
| 11-BSLS* | 52.7 | 19.8 | — | — | — | — | 1.1 | — | — | 6.4 | 4.7 |
| 12-2AO-2.36 | 16.2 | 23.4 | — | 58.6 | — | — | — | 1.8 | 0.4 | 12.4 | — |
| 13-2AF-2.36 | 14.2 | 20.2 | — | 40.9 | — | — | — | 24.7 | 6.0 | — | 9.8 |
| 14-3BO-0.85 | 31.8 | — | 67.4 | 33.4 | — | — | — | 0.8 | 0.0 | 11.2 | 8.4 |
| 15-3BF-0.85 | 30.6 | — | 64.9 | 29.2 | — | — | — | 5.9 | 0.7 | — | — |
| 16-4CO-1.00 | — | — | — | — | — | — | — | — | — | — | — |
| 17-BSRP** | 53.5 | — | — | — | — | — | — | — | — | 5.8 | 5.8 |
| 18-3BRP*** | 56.6 | — | — | — | — | — | — | — | — | 6.2 | 6.2 |

* Commercial Basic Copper Sulate, Laboratory Synthesis
** Commercial Basic Copper Sulfate, Regular Production
*** Copper Oxychloride, Regular Production Code Explanation:

First No. — number in sequence

Second No. — base used to fix copper: 1-$Ca(OH)_2$ 2-$Na_2CO_3$ 3-NaOH, 4$NH_4OH$ First Letter — Copper Salt used: A-$CuSO_4.5H_2O$, B-$CuCl_2.2H_2O$,c-$Cu(OAC)_2.H_2O$ Second Letter— Preparative method: S-spray dried, D-Direct prep., O-Oven dried, F-Freeze dried.

Third No. — Equivalents of base used per equivalent of copper salt.

Third Letter (F) Solubles removed by filtration before drying.

This series of products was compared on a copper equivalency basis (0.24%) with directly prepared hydrogels to determine their phytotoxicity and effectiveness against tomato Early Blight. It is important that these data be interpreted in relation to the performance of the two Bordeaux samples from a previous test. Those earlier test data are included also in Table VI.

Example IV

The unique biological activity of the copper base fungicide of this invention as illustrated in the previous examples may be contributed by the complex chemicals in the form of an amorphous powder. The exact structures of these chemical substances, however, cannot be determined by existing established analytical procedures. The minor amount of crystalline substance in the fungicides can be identified by X-ray diffraction technique. As will be apparent from the X-ray diffraction data listed hereinbelow, the crystalline substance in the fungicide of this invention is substantially different from a conventional oven dried Bordeaux mixture and the published data of the prior dehydrated Bordeaux preparations. In this example, two samples of dehydrated Bordeaux mixtures were prepared from a standard 20-100 solution of copper sulfate and calcium hydroxide using the afore-described spray drying and oven drying techniques, respectively.

The X-ray diffraction patterns were prepared using the Debye-Scherer powder camera with a radius of 57.6 mm. Nickel-filtered copper radiation was employed with a current of 30 KV and 15 MA. The two samples were exposed for 3 hours each and the resulting films were developed and the "*d*" spacing for the lines found was measured and tabulated in Table VI.

Table VI

Biological Data

| Sample Code | No Rain %Disease | No Rain Spray Deposit Rating | Rain %Disease | Rain Spray Depost Rating |
|---|---|---|---|---|
| 1-2AS-2.36 | 3 | 1 | 22 | 2 |
| 2-2AS-1.00 | 2 | 1 | 28 | 3 |
| 3-3AS-0.95 | 5 | 2 | 26 | 3 |
| 4-4AS-1.00 | 2* | 2 | 24 | 4 |
| 19-2AD-2.36 | 2 | 2 | 30 | 1 |
| 20-2AD-1.00 | 3 | 3 | 22 | 2 |
| 21-3AD-0.95 | 1*** | 2 | *** | 2 |
| 22-4AD-1.00 | 1 | 2 | 20 | 3 |
| 12-2AO-1.00 | 1 | 3 | 24 | 4 |
| 15-2AF-2.36 | 6 | 1 | 27 | 4 |
| 8-3CS-0.85 | 18** | 4 | 24 | 4 |
| 9-1CS-2.0 | 27 | 1 | 24 | 2 |
| 26-3CD-0.85 | 12* | 2 | 24* | 3 |
| 27-1CD-2.00 | 11 | 1 | 20 | 2 |
| 5-3BS-0.85' | 7 | 4 | 19 | 4 |
| 6-4BS-1.00 | 2** | 2 | 13 | 4 |
| 7-1BS-1.5 | 4 | 1 | 16 | 3 |
| 23-3BD-0.85 | *** | 2 | *** | 3 |
| 24-4BD-1.00 | *** | 2 | *** | 3 |
| 25-1BD-1.50 | 5 | 1 | ** | 2 |
| 12-3BS-0.85 | 10 | 4 | 19 | 4 |
| 14-3BO-0.85 | 18 | 1 | 39 | 4 |
| 15-3BF-0.85 | 7 | 3 | 31 | 4 |
| 18-3BRP | 7 | 1 | 30 | 3 |
| 1-SM | 2 | 1 | 24 | 2 |
| 2-SC | 2 | 1 | 19 | 3 |
| 11-BSLA | 7 | 1 | 33 | 3 |
| 17-BSRP | 20 | 3 | 40 | 4 |

(1) Spray deposit rating: 1=heavy deposit, 2-moderate deposit, 3= Light deposit, 4- no deposit visible.
(2) D refers to direct preparation of experimental samples used as controls for the dried samples.
* Slight burn, small spots
** Moderate Burn
*** Heavy burn Table VI

| Intensity | Oven dried 10-10-100 Bordeaux mixture Measured "d" Spacings | NBS $CaSO_4.2H_2O$ |
|---|---|---|
| ms | 9.07 | — |
| MS | 7.69 | 7.56 |
| ms | 6.61 | — |
| w | 4.96 | — |
| 2-Band | 4.59 | — |
| s | 4.30 | 4.27 |
| vw | 3.83 | — |
| vw | 3.40 | — |
| ms | 3.31 | — |
| ms | 3.08 | 3.06 |
| ms | 2.89 | 2.87 |
| w | 2.80 | — |
| w | 2.70 | — |
| w | 2.65 | 2.66 |
| s | 2.46 | — |
| w | 2.36 | — |
| w | 2.27 | — |
| w | 2.24 | 2.24 |
| w | 2.10 | — |

| Indensity | Spray dried 10-10-100 Bordeaux mixture Measured "d" spacings | NBS $Ca(OH)_2$ |
|---|---|---|
| s | 4.90 | 4.90 |
| w | 4.31 | — |
| w | 3.49 | — |
| ms | 3.11 | 3.11 |
| s | 2.63 | 2.63 |
| ms | 1.93 | 1.93 |
| ms | 1.80 | 1.80 |
| w | 1.70 | 1.69 |

The intensity of the diffraction patterns obtained in both samples indicates that only a small portion of the material is crystalline. The spray dried crystalline material appears to be essentially calcium hydroxide with two weak lines which could not be identified.

The oven dried material appears to be more crystalline with calcium sulfate-dihydrate comprising a major portion of the crystalline material. However, there appears to be one or more other compounds whose identity could not be established. The diffraction pattern of the unknown material appears to be as intense as the calcium sulfate. Utilizing the standard Bochman equipment and technique, the powder has particle size in the range of 5–15 microns with a few particles in the size up to 75 microns.

Example V

Further to illustrate the extremely low phytotoxicity of the present fungicide, a 40–50 dehydrated Bordeaux mixture, spray dried according to the process described in Example 1, was prepared and used to make up a fungicidal suspension 10 times the required copper concentration for effective fungicidal control. 10 ml dosages were applied to standardized potted tomato plants and allowed to dry. After drying, the plants were subjected to 2 inches of rainfall. No phytotoxic reaction was observable on the plant leaves.

Example VI

At lower concentrations, the fungicidal activities of the present copper base fungicide are at least equivalent to and, in most cases, better than a freshly prepared Bordeaux mixture with an equivalent copper concentration. For illustration, three different sets of Bordeaus mixtures were used. In each set, two reconstituted aqueous sprays using the dehydrated copper base fungicide of this invention were used to compare with a freshly prepared equivalent Bordeaux mixture.

For this example, the following stock solutions were initially prepared:

Solution (1) Copper Sulfate Solution — 1,664 g of Copper Sulfate pentahydrate dissolved in 8 liters of softened tap water.

Solution (2) Calcium Hydroxide Suspension — 1,664 g of Calcium Hydroxide added slowly with stirring to 8 liters of softened tap water.

These stock solutions were used to prepare copper based fungicides. The group designated "A" was prepared by spray drying an equal volume mixture of solutions (1) and (2). The dehydrated fungicides were subsequently reconstituted to three different concentrations and their fungicidal effectiveness was compared with equivalent freshly prepared Bordeaux mixtures using solutions (1) and (2). The same test procedures as described hereinabove were used. The results of these tests are tabulated in Table VII.

Table VII

Tomato Early Blight Control by Fresh and Dry Bordeaux Mixtures Following Exposure to Artificial Rainfall

| Material | Amt. Applied (mls) | %Disease Following Various Amts. of Rainfall* (Avg. 3 replications) 0" | ½" | 2" | 4" |
|---|---|---|---|---|---|
| Standard Bordeaux 5+5—50 | 30 | A | B | C | D |
| | 20 | A | B | C | D |
| | 10 | A | A | B | B |
| A,5-5-50 | 30 | 0 | 1 | 1 | 9 |
| | 20 | 0 | 3 | 7 | 7 |
| | 10 | 1 | 14 | 6 | 14 |
| Standard Bordeaux 4-4-50 | 30 | 9(A) | 15(B) | D | D |
| | 20 | 6(A) | 8(A) | C | D |
| | 10 | 6(A) | 9(B) | B | D |
| A,4-4-50 | 30 | 3 | 6 | 22 | 17 |
| | 20 | 7 | 13 | 13 | 30 |
| | 10 | 7 | 13 | 27 | 30 |
| Standard Bordeaux | 10 | 6 | 12 | 20 | 50 |
| 2-2-50 | 30 | 6 | 7 | 11 | 19 |
| | 20 | 6 | 8 | 10 | 15 |
| | 10 | 9 | 9 | 13 | 12 |
| A,2-2-50 | 30 | 3 | 8 | 8 | 19 |
| | 20 | 3 | 12 | 13 | 17 |
| | 10 | 8 | 12 | 34 | 24 |

* A-Slight burn, B-Moderate burn, C-Heavy burn, D-Very heavy burn.

This data not only demonstrates that the copper base fungicide of this invention possesses fungicidal activity comparable to fresh Bordeaux, but it also shows a significant advantage in regard to phytotoxicity. It is also noted that the fungicides of this invention stored in a sealed container have shown activity equal to freshly prepared samples after 1 year of storage.

Example VII

Sucrose Extractability of spray Dried Bordeaux Mixtures of this Invention

H. P. Burchfield and J. Schechtman in *Contributions of Boyce Thompson Institute* 18 (4), pp. 215–223, July–September, 1955 reported a sucrose extractability technique with which they were able to measure the amount of sucrose-soluble copper present in various Bordeaux mixtures. Their experiments showed that freshly prepared 10-10-100 Bordeaux which adheres to foilage quite readily, contains significantly more extractable copper than aged 10-10-100 Bordeaux, which does not adhere as well to foilage. It has long been accepted, according to Burchfield, that within a few hours from the time of preparation, 10-10-100 Bordeaux mixture changes from an amorphous hydrogel to a crystalloid composed primarily of large sphaerocrystals. These large crystals would not be expected to adhere to plant foliage when subjected to wind and rainfall due to their granular nature. It seems evident, therefore, that Burchfield, by means of his sucrose extractability technique, has developed a method for measuring the loss in weatherability of conventional Bordeaux mixtures as a function of crystalline growth.

Since in the previous examples described above various spray-dried Bordeaux mixtures of this invention possess fungicidal activity fully comparable to that found in their freshly prepared counterparts, this example compares sucrose extractability of freshly prepared Bordeaux mixtures with corresponding spray-dried and oven-dried Bordeaux mixtures to establish a degree of correlation between sucrose extractability and fungicidal activity. In this example experiments were conducted using freshly prepared 10-10-100 and 10-3.7-100 Bordeaux, as well as spray-dried and oven-dried materials (prepared according to the procedures set forth in Example 1 using the medium spray drying conditions for preparing the spray dried materials) immediately after reconstitution.

The sucrose extractability experiments for freshly prepared 10-10-100 Bordeaux mixtures was conducted by adding 12 g. of copper sulfate dissolved in 1 liter of distilled water to a slurry of 12 g. of lime dispersed in 1 liter of distilled water while mixing for 2 minutes with a mixer. 10 ml. aliquotes were withdrawn therefrom and added to test tubes where they were shaken with 5 ml. quantities of a 10 percent sucrose solution for 4 minutes. The Bordeaux-sucrose solutions were then filtered through medium porosity sintered glass funnels using vacuum and the optical densities were determined at 650 m$\mu$. In the case of 10-3.7-100 fresh Bordeaux (prepared in a similar manner described above with the exception that the amount of lime is lowered to the indicated ratio), the pH of the mixture was adjusted by the addition of sodium hydroxide in the form of a 20 percent solution to pHs of 12.3 and 13.0 in two separate tests.

The spray-dried, as well as the oven-dried, Bordeaux mixtures were prepared by adding weighed amounts of the 10-10-100 or 10-3.7-100 Bordeaux in powder form equivalent in copper content to the amount of copper contained in 1 liter of fresh Bordeaux mixture into a 1 liter of distilled water contained in 1 quart jars. The sucrose extraction tests were similar to the one described above for the fresh 10-10-100 Bordeaux.

The results of representative sucrose extractability measurements are as follows:

| Bordeaux Formulation | Sucrose Extract. in O.D. Units pH 12.3 | pH 13.0 |
|---|---|---|
| Fresh 10-10-100 | 0.90 | 1.00 |
| Fresh 10-3.7-100 | 0.36 | 0.82 |
| Spray Dried 10-10-100 (FT-2) | 0.80 | 1.00 |
| Spray Dried 10-3.7-100 (FT-4) | 0.14 | 0.58 |
| Oven Dried 10-10-100 | 0.07 | 0.17 |
| Oven Dried 10-3.7-100 | 0.06 | 0.18 |

While the reproducibility of the sucrose extractability measurements is not precise, the spray-dried Bordeaux of this invention after reconstitution generally possesses sucrose extractability comparable to their freshly prepared counterpart. In sharp contrast, Bordeaux's that have been oven-dried, then reconstituted, show very little sucrose extractability. This example thus illustrates a degree of correlation between sucrose extractability and actual fungicidal activity of Bordeaux mixtures.

Example VIII

In preparing the stable copper base fungicides of this invention using the spray-drying as well as the freeze drying techniques, the aqueous mixture of the soluble copper salt and an alkali should be processed as soon as possible in order to retain the fungicidal activity of the dried resultant products. In commercial production, a certain time lapse between mixing and drying, however, is inevitable. In order to produce the fungicides of this invention, the lapsed time or the aging factor must be carefully controlled in order to avoid appreciable loss of fungicidal activity of the product.

The tolerable time limit between mixing and drying in the process of this invention varies according to concentration and stoichiometric factors. In the previously identified Burchfield et al publication, the authors found (1) when the temperature was increased crystallite growth took place more rapidly, (2) concentrated Bordeaux mixtures (i.e., 20-20-100) were found to be more stable when the amounts of copper sulfate and lime were equal, and (3) an increase in stability was noted when the lime content was reduced to below one half the copper sulfate content.

In this example the aging factors were investigated using a number of spray-dried Bordeaux mixtures prepared in the same manner as described in Example I. The results of the experiments are tabulated below:

Table VIII

Analytical Data, Aged and Spray Dried Bordeaux Samples

| Sample Designation | % Cu | % $SO_4$ | %Ca as $Ca(OH)_2$ | %Moisture O.D. | %Moisture by Diff. | Calcd.Moles Hydrated $H_2O$/MoleCu | pH After Drying |
|---|---|---|---|---|---|---|---|
| 1-20-100-24 | 15.7 | 23.5 | 48.2 | 5.3 | 12.6 | 2.8 | 12.2 |
| 2-20-100-24-1.25 | 20.9 | 35.1 | 30.4 | 8.8 | 13.6 | 2.3 | 10.5 |
| 3-20-100 | 13.7 | 21.7 | 49.8 | 4.6 | 14.8 | 3.8 | 12.2 |
| 4-20-100-2 | 13.4 | 22.8 | 50.9 | 3.8 | 12.9 | 3.4 | 12.2 |
| 5-20-100-2-1.25 | 21.4 | 33.3 | 30.5 | 8.9 | 14.8 | 2.5 | 10.9 |
| 6-20-100-1.25 | 21.9 | 33.2 | 31.0 | 6.3 | 13.9 | 2.2 | 11.8 |
| 7-20-100-8-1.25 | 21.0 | 34.3 | 28.6 | 8.2 | 16.1 | 2.8 | 12.1 |
| 8-20-100-8 | 14.1 | 23.4 | 49.3 | 3.7 | 13.1 | 3.3 | 12.1 |

First No. — number in sequence

Second No. — total parts of copper sulfate and lime per 100 parts of water

Third No. — parts of water per formulation
Fourth No. — hours aged prior to spray drying
1.25 — number of equivalents of lime per/equivalent of copper sulfate, if no number is listed the value is 3.38

Table IX

Effect of Aging Prior to Spray Drying with 20-100 Bordeaux Mixtures with 1.25 lime to copper sulfate equivalent

| Material Sprayed | Dose ppm Cu | No Rain % Disease | Rain % Disease |
|---|---|---|---|
| 6-20-100-1.25* | 2400 | 8 | 8 |
| | 1000 | 23 | 12 |
| | 200 | 24 | 24 |
| | 40 | 48 | 36 |
| | 8 | 44 | 77 |
| 5-20-100-2-1.25 | 2400 | 7 | 14 |
| | 1000 | 10 | 16 |
| | 200 | 21 | 34 |
| | 40 | 32 | 66 |
| | 8 | 62 | 100 |
| 7-20-100-8-1.25 | 2400 | 5 | 7 |
| | 1000 | 5 | 7 |
| | 200 | 8 | 13 |
| | 40 | 20 | 21 |
| | 8 | 34 | 75 |

* — see Table VIII for code identification.

Table X

Effect of Aging Prior to Spray Drying with 20-100 Bordeaux Mixture

| Material Sprayed | Dose ppm Cu | No Rain % Disease | Rain % Disease |
|---|---|---|---|
| 3-20-100* | 2400 | 7 | 6 |
| | 1000 | 11 | 14 |
| | 200 | 15 | 22 |
| | 40 | 34 | 29 |
| | 8 | 47 | 39 |
| 4-20-100-2 | 2400 | 5 | 15 |
| | 1000 | 8 | 19 |
| | 200 | 15 | 22 |
| | 40 | 17 | 30 |
| | 8 | 36 | 50 |
| 8-30-100-8 | 2400 | 5 | 8 |
| | 1000 | 10 | 11 |
| | 200 | 16 | 47 |
| | 40 | 35 | 41 |
| | 8 | 50 | 73 |
| 1-20-100-24 | 2400 | 3 | 15 |
| | 1000 | 10 | 22 |
| | 200 | 22 | 27 |
| | 40 | 28 | 71 |
| | 8 | 39 | 72 |

If the Bordeaux mixture were allowed to sit at room temperature for longer than 24 hours prior to spray drying the resultant product has a notable decrease in the biological activity. Table XI shows the effect of aging for 7 days prior to spray drying with a 20-100 Bordeaux mixture.

Table XI

| | Dose ppm Cu | No Rain % disease | Rain % disease |
|---|---|---|---|
| 20-100-168-1.25 | 1000 | 0 | 8 |
| | 200 | 1 | 10 |
| | 40 | 9 | 48 |
| | 8 | 17 | 80 |
| 20-100-168 | 1000 | 3 | 82 |
| | 200 | 5 | 100 |
| | 40 | 24 | 100 |
| | 8 | 63 | 100 |

We claim:

1. A stable Bordeaux mixture in powder form consisting of dehydrated copper base precipitates preponderantly in amorphous form of a freshly prepared aqueous interaction mixture of copper sulfate and calcium hydroxide, said powder Bordeaux mixture being capable of redispersing in water to form an aqueous spray mixture having fungicidal activity.

2. The stable Bordeaux mixture in powder form according to claim 1 wherein the freshly prepared aqueous mixture contains, per 100 a parts by weight of water, 5 to about 10 parts by weight of copper sulfate, and 3 to about 10 parts by weight of calcium hydroxide.

3. A dry, stable copper base fungicide product in powder form consisting of dehydrated precipitates preponderantly in amorphous form of an aqueous interaction mixture of a water-soluble copper salt selected from the group consisting of copper sulphate, copper chloride, copper acetate, copper phosphate, copper silicate and copper arsenate and an alkali material selected from the group consisting of calcium hydroxide, sodium hydroxide, ammonium hydroxide and sodium carbonate, said product characterized by be redispersable in water to form an aqueous mixture.

4. A process for producing a dry, stable copper fungicide product comprising forming an aqueous solution consisting of copper sulphate with calcium hydroxide, mixing the solution for a time sufficient to form a copper base precipitate in the form of a preponderantly amorphous precipitate, dehydrating the resultant mixture in an atmosphere sufficient to maintain the structure of a copper base precipitate in a predominantly amorphous state, and recovering the resultant dehydrated product.

5. A process for producing a dry stable copper base fungicide comprising a. forming a mixture consisting of a water-soluble copper salt selected from the group consisting of copper sulphate, copper chloride, copper acetate, copper phosphate, copper silicate, and copper arsenate with an alkali material selected from the group consisting of sodium hydroxide, calcium hydroxide, ammonium hydroxide and sodium carbonate in an aqueous solution, b. atomizing the resultant mixture at a temperature in the range of from about 175° to about 600°F. in a chamber to evaporate the water thereof to produce a copper base precipitate in a preponderantly amorphous state and c. recovering the dehydrated product therefrom.

6. The process accoding to claim 5 wherein the water soluble salt is copper sulfate and the alkali material is calcium hydroxide.

7. The process according to claim 6 wherein 5 to 10 parts of copper sulfate and 3 to 10 parts of calcium hydroxide are mixed with 100 parts of water.

8. A process for producing a dry, stable copper base fungicide comprising a. mixing copper sulphate with calcium hydroxide in an aqueous solution to produce a copper base precipitate, b. freezing the resultant aqueous mixture, c. subliming the frozen mixture in a vacuum chamber to eliminate the water, d. recovering the dehyrated product.

9. A process for producing a dry, stable copper base fungicide comprising a. mixing copper sulphate with calcium hydroxide in an aqueous solution to produce a copper base precipitate, b. cooling the resultant slurry to below about 45°F.

c. vaporizing the cooled mixture in a vacuum chamber to eliminate the water, d. recovering the dehyrated product.

* * * * *